UNITED STATES PATENT OFFICE 3,618,469
Patented Nov. 9, 1971

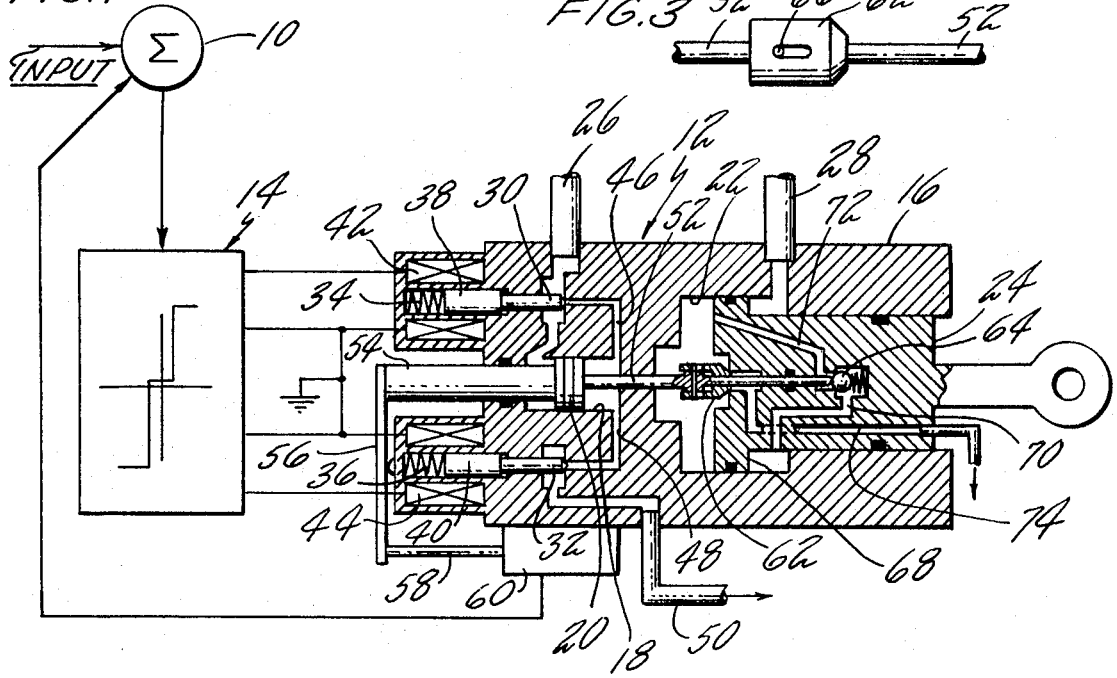

3,618,469
SOLENOID OPERATED ACTUATOR SYSTEM
Donald F. Wills, Suffield, and Ronald E. Falk, Bristol, Conn., assignors to Chandler Evans Inc., West Hartford, Conn.
Filed Sept. 19, 1968, Ser. No. 760,817
Int. Cl. F15b 13/16, 15/17
U.S. Cl. 91—361                                    19 Claims

ABSTRACT OF THE DISCLOSURE

A stable, proportional control system having an actuator characterized by a first stage comprising an integrating pilot piston, the flow of operating fluid to the pilot piston chamber being controlled by opposed solenoid operated valves. The solenoid operated valves are responsive to amplifying and switching circuitry having an accurately controlled deadband, the switching circuitry being responsive to command signals and pilot piston position feedback signal. The pilot piston, via a suitable linkage, controls the operation of valves which control the delivery of operating fluid to a second stage in which is disposed a load connected, differential area slave piston.

BACKGROUND OF THE INVENTION

(1) Field of the invention

The present invention relates to the actuation of movable members. More particularly, the present invention is directed to closed loop, hybrid positioning systems. Accordingly, the general objects of the present invention are to provide novel and improved methods and apparatus of such character.

(2) Description of the prior art

While not limited thereto in its utility, the present invention is particularly well suited for employment in environments where weight, reliability, accuracy and cost of an actuator are of concern. An example of such an environment would be a missile control system wherein means must be provided for positioning control fins. Such positioning systems must be responsive to analog input signals and must be characterized by lightweight, high reliability, fast and stable response and dynamic and static stiffness. Implicit in the design criteria for such systems is the requirement that overshoot be eliminated.

In the prior art, the use of high resolution torque motors has predominated proportional control system design thinking. However, as is well known, the torque motor is somewhat lacking in reliability and is a relatively heavy and bulky device. In addition, the expense of torque motors is generally considered to be excessive for employment in one-shot application, high production quantity positioning systems.

In an attempt to avoid the use of high resolution torque motors, attention has recently been directed to the design of opposed solenoid control devices and systems. Such systems are aimed at exploiting the solenoids' inherent advantages of rapid response and low cost. Previous solenoid control systems have been operated by electronic switching circuits of the "bang-bang" type which energized either one or the other of the opposed solenoids and were characterized by closing the position feedback loop about the second stage load and thus dynamic stability was sensitive to changes in the load. Such systems permit overshoot and limit cycling of the valves to occur as the desired load position is attained. Further, prior art opposed solenoid control systems have been characterized by susceptibilbity of fluid flow paths to contamination and/or to valve leakage.

Summary of the invention

The present invention overcomes the foregoing and other disadvantages of the prior art by providing a novel positioning system and electronic and mechanical elements thereof, the positioning system being of the proportional, closed loop, hybrid type. Thus, the present invention contemplates an actuator wherein a stable first stage pilot piston is controlled by a pair of solenoid operated poppet valves. These valves and the fluid flow passages in which they are disposed are so designed as to be virtually contamination proof. The pilot piston is coupled to a transducer and a pilot piston position signal is generated and fed back to an electronic control system where it is summed with the input command. The electronic control, which causes energization of one or the other of the solenoids, is comprised of a novel differential amplifier system which achieves deadband switching through the use of a floating reference.

The pilot piston is also coupled to a stable second stage incorporating a load connected, differential area slave piston. The stage-to-stage coupling means controls valves which in turn regulate the flow of operating fluid for the second stage piston. As in the case of the first stage, the valves which control the movement of the second stage piston and the fluid flow passages in which such valves are disposed are designed so as to render the system virtually contamination proof.

It is, accordingly, an object of the present invention to provide a positioning system which is stable in the dynamic sense.

It is another object of the present invention to provide a closed loop positioning system wherein overshoot of the actuating means is eliminated.

It is a further object of the present invention to provide a closed loop, hybrid positioning system wherein the possibility of contamination of fluid flow paths is virtually eliminated.

It is still another object of the present invention to provide an actuating mechanism for a positioning system wherein a first stage pilot piston is isolated from the load.

It is still another object of the present invention to provide a fluid operated actuating mechanism wherein all flow paths are large and thereby little apt to become clogged by debris entrained in the working fluid.

It is another object of the present invention to provide a fluid responsive actuator which may employ different fluids to operate pilot and slave stages.

It is also an object of the present invention to provide a two-stage, fluid operated actuator employing contamination-insensitive valves.

It is yet another object of the present invention to provide a solid state amplifying and switching circuit for an opposed solenoid control system.

It is a further object of the present invention to provide a high-speed, solid state amplifying and switching circuit which provides an accurately controlled deadband.

It is still another object of the present invention to provide a high-speed, solid state amplifying and switching circuit which utilizes a floating reference in combination with a pair of outputs from a differential amplifier to achieve an accurately controlled deadband.

It is also an object of the present invention to provide a closed loop, hybrid positioning system which is lighter in weight, more reliable and possessed of faster and more stable response and greater dynamic and static stiffness than prior art systems of like character.

It is still another object of the present invention to provide a closed loop, hybrid positioning system which is responsive to analog input signals and which is less expensive than prior art devices of comparable accuracy.

It is another object of the present invention to provide a closed loop, hybrid positioning system employing an opposed solenoid type actuator.

BRIEF DESCRIPTION OF THE DRAWING

The foregoing and other objects and advantages of the present invention will become obvious to those skilled in the art and the invention may be better understood by reference to the accompanying drawing wherein like reference numerals refer to like elements in the various figures and in which:

FIG. 1 depicts a preferred embodiment of a closed loop, hybrid positioning system in accordance with the present invention; the electrical components of the invention being shown in block form and the actuating mechanism being shown in a cross-sectional, side elevation view.

FIG. 2 is a schematic showing of the switching and amplifying circuitry shown in block in FIG. 1.

FIG. 3 is an enlarged, top view of a portion of the actuator of the embodiment of FIG. 1.

DESCRIPTION OF THE PREFERRED EMBODIMENT

With reference now to FIG. 1, a preferred embodiment of a closed loop, hybrid positioning system in accordance with the present invention is shown. The system comprises an input summing circuit 10 wherein an input command signal and a feedback signal from the actuator, indicated generally at 12, are combined to generate a control signal. The control signal from summing circuit 10 is applied to a solid state, high-speed amplifying and switching circuit indicated generally at 14. In the manner to be described below in the description of FIG. 2, circuit 14 provides output signals for energizing one or the other of a pair of opposed, solenoid operated control valves in actuator 12.

Actuator 12 comprises a casing 16 which defines first and second stages of the device. The first stage is comprised of a first chamber or cylinder 18 in which is disposed a pilot piston 20. The second stage of the actuator comprises a chamber or cylinder 22 in which is disposed a load connected differential area slave piston 24.

The fluid supply lines through which pressurized fluid is delivered to chambers 18 and 22 are respectively indicated at 26 and 28. Depending upon the application, lines 26 and 28 may be connected to either the same or different sources of pressurized fluid. In a typical example, line 26 will be connected to a pressurized source of hydraulic fluid while line 28 will be connected to a pressurized gas supply.

Pressurized fluid delivered to actuator 12 via line 26 will be supplied directly to chamber 18 rearwardly or, considering FIG. 1, to the left of pilot piston 20. In FIG. 1, piston 20 is shown in a stable or deadband position wherein the plug members of poppet-type solenoid operated control valves 30 and 32 are seated and the valves closed. Valves 30 and 32 are respectively maintained in the closed position by valve springs 34 and 36. With valves 30 and 32 closed, fluid will be trapped in chamber 18 at the forward side of piston 20 and, presuming the fluid source pressure to remain constant, the piston cannot move until such time as one of valves 30 or 32 is opened.

The plug or closure members for valves 30 and 32 are respectively extensions of core members 38 and 40, the core members being respectively disposed within solenoids 42 and 44. Solenoids 42 and 44 will be energized by output signals from switching and amplifying circuit 14. The energization of solenoid 42 will result in the opening of valve 30 thereby placing the portion of chamber 18 forward of piston 20 in communication with the pressurized fluid source. As may be seen, the effective surface area of the forward side of piston 20 is greater than that of the opposite side of the piston, a 2:1 ratio being preferred, and thus the opening of valve 30 will cause the piston to move to the left as shown in FIG. 1.

It should also be noted that the fluid flow path between each of valves 30 and 32 and the portion of chamber 18 disposed forwardly of piston 20, such paths being indicated respectively at 46 and 48, are calibrated to provide a predetermined speed of movement of the piston. Restated, flow into or out of the forward end of chamber 18 is at a calibrated rate whereby piston 20 will move at a calibrated speed. It should also be noted that, while flow paths 46 and 48 are calibrated, these paths are of relatively large size thereby virtually eliminating any chance that they may become contaminated by any dirt suspended in the operating fluid. Similarly, since valves 30 and 32 are preferably poppet-type valves, these valves exhibit little leakage and there is little chance of their becoming fouled.

As will become apparent from a description of FIG. 2, solenoids 42 and 44 cannot be energized at the same time and, in fact, the system has a built-in deadband whereby one solenoid cannot be energized until after the other solenoid has been de-energized for a finite period of time. Energization of solenoid 44, in the same manner as above described with relation to solenoid 42, will cause opening of valve 32 thereby venting fluid from chamber 18 ahead of piston 20 via flow path 48 and drain 50. Accordingly, upon the opening of valve 32, pilot piston 20 will move to the right or in the forward direction under the influence of the pressurized fluid acting on the rear side of the piston.

Motion of pilot piston 20 is transmitted via a connecting rod 52 to the second stage of the actuator and via a second connecting rod 54 and linkages 56 and 58 to a transducer 60. Transducer 60 may, for example, be a potentiometer having a source of direct current, not shown, connected thereto. Motion of piston 20 will be coupled to and cause the movement of an element of transducer 60 whereby a feedback signal will be generated and applied as an input to summing circuit 10. The provision of a piston position feedback signal results in the first stage of the actuator of the present invention functioning as an integrating piston with a constant integration rate independent of load.

In the second stage of the actuator, the connecting rod 52 extends through the plug member 62 of a poppet-type valve and continues into the slave piston 24 wherein controls the operation of a ball valve 64. As may best be seen from FIG. 3, plug member 62 has a pair of elongated slots therein and is secured to rod 52 by means of a pin 66 which passes through rod 52. Accordingly, rod 52 is capable of a limited degree of movement axially of slave piston 24 without affecting the state of the valve comprised of plug member 62. Fluid under pressure delivered to casing 16 via supply line 28 will, in the deadband position of slave piston 24 shown, act on forward facing shoulder 68 of the piston and thus attempt to urge the piston rearwardly or toward the first stage. Fluid from the pressurized source will not, with the ball valve 64 and poppet valve plug member 62 in the positions shown, be delivered to chamber 22, the delivery of fluid to chamber 22 being blocked by ball valve 64 which is maintained in the closed position by the valve spring 65. Fluid will, of course, be trapped in chamber 22 from the previous opening of ball valve 64 and thus slave piston 24 will assume a stable state. Opening of valve 64 in the manner to be described below will permit fluid to flow from supply line 28 to the interior of chamber 22 via supply passages 70 and 72 formed in slave piston 24. Opening of valve member 62 will vent fluid from chamber 22 via vent passage 74 also formed in piston 24.

Forward motion of pilot piston 20 in the first stage will be transmitted directly to ball valve 64 via connecting rod 52, rod 52 being movable in the forward direction relative to closed poppet valve plug member 62 in the manner above described. Forward movement of piston 20 results in the opening of ball valve 64 and the delivery of pressurized fluid to chamber 22. Due to the area differential between the rear side of slave piston 24 and the shoulder 68, the delivery of fluid to chamber 22 will cause forward movement of the piston 24 and thus cause repositioning of the load connected thereto. Forward movement of slave piston 24 by an amount determined by the forward movement of pilot piston 20 and thus of rod 52 will, of course, result in ball valve 64 reclosing and thus it may be seen that the second stage of the actuating mechanism of the present invention is also stable of itself.

When piston 20 moves to the left or in the rearward direction, poppet valve plug member 62 will immediately be removed from seating relationship with the mouth of vent passage 74, ball valve 64 remaining closed, and pressurized fluid will be vented from chamber 22. Thus, slave piston 24 will follow the movement of pilot piston 20 and travel to the left to the point where member 62 is again seated in the vent passage.

As previously mentioned, and as indicated by the wave form depicted within switching and amplifying circuit 14 on FIG. 1, the present invention also comprises a high-speed, solid state electronic control circuit which incorporates a deadband to thereby eliminate limit cycling of solenoid operated valves 30 and 32. The output signal from summing circuit 10 will comprise an analog signal commensurate with the desired position of the load connected to slave piston 24 as summed with the feedback signal commensurate with the actual load position (the position of pilot piston 20). Switching and amplifying circuit 14 comprises a first differential amplifier including transistors Q1 and Q2 and a pair of output differential amplifiers 80 and 82 which respectively provide signals for the energization of solenoids 42 and 44.

It is to be noted that the collector circuit of transistor Q2 of the first or input differential amplifier comprises a voltage divider circuit consisting of resistors R1 and R2. The junction of resistors R1 and R2 is connected, via conductor 84, to a first input of differential amplifier 80. The other end of resistor R2, which is connected directly to the collector of transistor Q2, is connected to a first input of differential amplifier 82 via conductor 86. With transistor Q2 in the active state, reference voltages will be applied via conductors 84 and 86 respectively to differential amplifiers 80 and 82. The inputs to differential amplifiers 80 and 82 will, of course, vary by an amount determined by the transistor Q2 collector current and the size of resistor R2, the input to amplifier 82 being less positive than the input to amplifier 80. It is to be noted that adjustment of the reference voltages applied via conductors 84 and 86 to differetnial amplifiers 80 and 82 may be accomplished via potentiometer R3 in the base circuit of transistor Q2. It is also to be noted that the reefrence input voltages to differential amplifiers 80 and 82 will vary with the magnitude of the input signal to the first differential amplifier since transistors Q1 and Q2 share a common emitter resistor R4. Thus, the differential amplifiers 80 and 82 which function as switches to control the energization of respective solenoids 42 and 44 are each supplied with a floating reference input signal.

The reference signals applied to differential amplifiers 80 and 82, via conductors 84 and 86 respectively, are compared in the amplifiers with the input signal from summing circuit 10 as amplified by input transistor Q1. The input signal is thus tapped off the collector circuit of transistor Q1 and delivered via conductor 88 to the second inputs of differential amplifiers 80 and 82. If the input signal applied to differential amplifiers 80 and 82 via conductor 88 lies within the deadband region established by the reference voltage developed across transistor Q2 collector resistor R2, neither of solenoids 42 or 44 will be energized. However, if the information or command signal transmitted via conductor 88 to amplifiers 80 and 82 exceeds the instantaneous collector voltage of transistor Q2, amplifier 82 will conduct and solenoid 44 will be energized thereby causing the pilot piston 20 to move in a forward direction. If the command signal appearing on conductor 88 is less than the voltage appearing on conductor 84, amplifier 80 will be gated on and will cause energization of solenoid 42 thereby moving pilot piston 20 in the opposite or rearward direction.

Thus, it may be seen that through the generation of a floating and adjustable deadband by means of providing a pair of reference voltages, limit cycling of the solenoid operated valves 30 and 32 is eliminated. That is, through the generation and application of a pair of reference signals to the switching amplifiers, the prior art problem of hunting associated with previous positioning systems is eliminated since the control voltage must swing through a range determined by the deadband established by the reference voltages before one solenoid can be de-energized and another energized. This, of course, creates a finite delay period for the system to stabilize as it approaches a newly commanded position.

While a preferred embodiment has been shown and described, various modifications and substitutions may be made thereto without departing from the spirit and scope of the present invention. Accordingly, it is to be understood that the present invention has been described by way of illustration and not limitation.

What is claimed is:

1. An actuator system comprising:
    fluid operated actuator means, said actuator means having a movable element which is adapted to be connected to a load to be positioned by said actuator means;
    means connected to said actuator means for controlling a flow of operating fluid thereto, said flow controlling means including first and second solenoid operated valves respectively for controlling movement of said movable element in first and second directions;
    means for generating a signal commensurate with the actual position of a load connected to said movable element;
    comparing means responsive to signals commensurate with actual load position and to load position input command signals for generating position error signals; and
    means responsive to position error signals generated by said comparing means for generating and applying valve control energization signals to said flow controlling means, said control signal generating means including means for providing an energizing signal for either said first or second valve means and establishing an intermediate deadband wherein neither of said valve means will be energized, said control signal generating means comprising:
    means responsive to a position error signal for generating a pair of reference voltage levels;
    first switch means responsive to the position error signal and the first of said reference voltages for generating an energizing signal for the solenoid of said first solenoid operated valve; and
    second switch means responsive to said position error signal and the second of said reference voltages for generating an energizing signal for the solenoid of said second solenoid operated valve.

2. The apparatus of claim 1 wherein said actuator means comprises:
    a casing defining first and second chambers;
    a fluid operated pilot piston disposed in said first chamber;
    follower means disposed in said second chamber;
    means for connecting said follower means to a load;
    means for coupling the motion of said pilot piston to said follower means; and
    means at least partly defined by said casing for directing the flow of operating fluid for said piston, said first and second solenoid operated valves of said flow controlling means being partly disposed in said flow directing means.

3. The apparatus of claim 2 wherein said follower means comprises:
a differental area slave piston disposed in said second chamber.

4. The apparatus of claim 3 wherein said motion coupling means comprises:
means for delivering fluid from a pressurized source to said second chamber at a first side of said slave piston;
flow control means for selectively pressurizing said second chamber at the other side of said slave piston; and
linkage means interconnecting said pilot piston and said second chamber flow control means whereby the pressure in said second chamber at said other side of said slave piston is commensurate with the position of said pilot piston.

5. The apparatus of claim 4 wherein said second chamber flow control means comprises:
means including a third valve for controlling the delivery of pressurized fluid to said second chamber at said other side of said slave piston, said third valve being operatively coupled to said linkage means and being opened in response to movement of said pilot piston in a first direction; and
means including a fourth valve for bleeding fluid from said second chamber at said other side of said slave piston, said fourth valve being operatively connected to said linkage means and being opened in response to movement of said pilot piston in a second direction.

6. The apparatus of claim 5 wherein said means including said third valve is in communication with the same source of pressurized fluid as said means for delivering said fluid to said second chamber at the first side of said slave piston.

7. The apparatus of claim 6 wherein said flow directing means comprises:
a first fluid supply passage in said casing for delivering a pressurized fluid to said first chamber at a first side of said pilot piston, said first solenoid operated valve being partly disposed in said first fluid supply passage; and
a first fluid discharge passage in said casing for bleeding fluid from said first chamber at said first side of said pilot piston, said second solenoid operated valve being partly disposed in said first fluid discharge passage.

8. The apparatus of claim 7 wherein said flow directing means further comprises:
means for supplying a pressurized fluid to said first chamber at the other side of said pilot piston.

9. The apparatus of claim 8 wherein said means for supplying a pressurized fluid to said first chamber at said other side of said pilot piston is in communication with the same fluid source as said first fluid supply passage and wherein said pilot piston is a differential area piston.

10. The apparatus of claim 6 wherein said means for generating valve energization control signals for said first and second solenoid operated valves comprises:
means responsive to a position error signal for generating a pair of reference voltage levels;
first switch means responsive to the position error signal and the first of said reference voltages for generating an energizing signal for the solenoid of said first solenoid operated valve; and
second switch means responsive to said position error signal and the second of said reference voltages for generating an energizing signal for the solenoid of said second solenoid operated valve.

11. The apparatus of claim 9 wherein said means for generating valve energization control signals for said first and second solenoid operated valves comprises:
means responsive to a position error signal for generating a pair of reference voltage levels;
first switch means responsive to the position error signal and the first of said reference voltages for generating an energizing signal for the solenoid of said first solenoid operated valve; and
second switch means responsive to said position error signal and the second of said reference voltages for generating an energizing signal for the solenoid of said second solenoid operated valve.

12. An actuator comprising:
a casing defining first and second chambers;
a fluid operated pilot piston disposed in said first chamber;
a slave piston disposed in said second chamber;
means for connecting said slave piston to a positionable load;
means for coupling the motion of said pilot piston to said slave piston;
a first fluid supply passage at least partly defined by said casing for delivering a pressurized fluid to said first chamber at a first side of said pilot piston;
a first solenoid operated valve partly disposed in said first fluid supply passage;
a first discharge passage at least partly defined by said casing for venting fluid from said first chamber at said first side of said pilot piston;
a second solenoid operated valve partly disposed in said first discharge passage; and
means for supplying a pressurized fluid to said first chamber at the other side of said pilot piston.

13. The apparatus of claim 12 wherein said means for supplying a pressurized fluid to said first chamber at said other side of said pilot piston is in communication with the same fluid source as said first fluid supply passage and wherein said pilot piston is a differential area piston.

14. The apparatus of claim 13 wherein said motion coupling means comprises:
means for delivering fluid from a pressurized source to said second chamber at a first side of said slave piston;
flow control means for selectively pressurizing said second chamber at the other side of said slave piston; and
linkage means interconnecting said pilot piston and said flow control means whereby the pressure in said second chamber at said other side of said slave piston is commensurate with the position of said pilot piston.

15. The apparatus of claim 14 wherein said flow control means comprises:
means including a third valve for controlling the delivery of pressurized fluid to said second chamber at said other side of said slave piston, said third valve being operatively coupled to said linkage means and being opened in response to movement of said pilot piston in a first direction; and
means including a fourth valve for bleeding fluid from said second chamber at said other side of said slave piston, said fourth valve being operatively connected to said linkage means and being opened in response to movement of said pilot piston in a second direction.

16. An actuator system comprising:
a casing defining first and second chambers;
a fluid operated pilot piston disposed in said first chamber;
follower means disposed in said second chamber;
means for connecting said follower means to a load;
means for coupling the motion of said pilot piston to said follower means;
a first fluid supply passage in said casing for delivering a pressurized fluid to said first chamber at a first side of said pilot piston;
a first fluid discharge passage in said casing for bleeding fluid from said chamber at said first side of said pilot piston;
means for controlling the flow of operating fluid in said system, said flow controlling means including first and second solenoid operated valves respectively being partly disposed in said first fluid supply passage and said first fluid discharge passage, said first and second solenoid operated valves controlling movements of said pilot piston;

means for generating a signal commensurate with the actual position of a load connected to said follower means;

comparing means responsive to signals commensurate with actual load position and to load position input command signals for generating position error signals; and means responsive to position error signals generated by said comparing means for generating and applying valve control energization signals to said flow controlling means, said control signal generating means including means for providing an energizing signal for either said first or second valve means and establishing an intermediate deadband wherein neither of said valve means will be energized.

17. The apparatus of claim 16 wherein said flow directing means further comprises:

means for supplying a pressurized fluid to said first chamber at the other side of said pilot piston.

18. The apparatus of claim 17 wherein said means for supplying a pressurized fluid to said first chamber at said other side of said pilot piston is in communication with the same fluid source as said first fluid supply passage and wherein said pilot piston is a differential area piston.

19. The apparatus of claim 18 wherein said means for generating valve energization control signals for said first and second solenoid operated valves comprises:

means responsive to a position error signal for generating a pair of reference voltage levels;

first switch means responsive to the position error signal and the first of said reference voltages for generating an energizing signal for the solenoid of said first solenoid operated valve; and second switch means responsive to position said error signal and the second of said reference voltages for generating an energizing signal for the solenoid of said second solenoid operated valve.

References Cited
UNITED STATES PATENTS

| | | | |
|---|---|---|---|
| 2,649,841 | 8/1953 | Jacques | 91—363 |
| 2,773,660 | 12/1956 | Rasmussen | 91—363 A |
| 3,266,378 | 8/1966 | Shaw | 91—363 |
| 3,295,421 | 1/1967 | McCormick | 91—363 |

PAUL E. MASLOUSKY, Primary Examiner

U.S. Cl. X.R.

91—376, 417, 461, 457